United States Patent
Okuda et al.

(10) Patent No.: US 10,081,389 B2
(45) Date of Patent: Sep. 25, 2018

(54) DRIVING SUPPORT APPARATUS FOR VEHICLE

(71) Applicant: TOYOTA JIDOSHA KABUSHIKI KAISHA, Toyota-shi (JP)

(72) Inventors: Yuji Okuda, Okazaki (JP); Hidenobu Kinugasa, Nagoya (JP); Yoshiya Iwaki, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 43 days.

(21) Appl. No.: 15/277,114

(22) Filed: Sep. 27, 2016

(65) Prior Publication Data

US 2017/0088175 A1    Mar. 30, 2017

(30) Foreign Application Priority Data

Sep. 28, 2015  (JP) .................................. 2015-189083

(51) Int. Cl.
    B62D 6/00    (2006.01)
    B62D 15/02    (2006.01)
(52) U.S. Cl.
    CPC ............ B62D 15/025 (2013.01); B62D 6/00 (2013.01)
(58) Field of Classification Search
    CPC .................................................. B62D 15/025
    See application file for complete search history.

(56) References Cited

U.S. PATENT DOCUMENTS

| 2008/0091318 A1* | 4/2008 | Deng | B62D 6/003 |
| | | | 701/41 |
| 2012/0303217 A1* | 11/2012 | Reichel | B62D 15/0265 |
| | | | 701/41 |
| 2014/0257628 A1* | 9/2014 | Lee | B62D 5/0481 |
| | | | 701/34.4 |

FOREIGN PATENT DOCUMENTS

| DE | 10 2011 122 566 A1 | 6/2013 |
| DE | 10 2015 210 085 A1 | 4/2016 |
| DE | 10 2015 207 024 A1 | 10/2016 |
| JP | 2014-142965 | 8/2014 |

OTHER PUBLICATIONS

Office Action issued in German Patent Application No. 10 2016 118 100.5, along with an English translation.

* cited by examiner

*Primary Examiner* — Kimberly Sue Berona
*Assistant Examiner* — Anshul Sood
(74) *Attorney, Agent, or Firm* — Oblon, McClelland, Maier & Neustadt, L.L.P.

(57) ABSTRACT

Even when a control mode is switched, hands-off driving handling processing can be appropriately carried out. A hands-off determination unit is configured to start measurement of a no-operation state continuation period when a no-operation state in which a driver is estimated not to be operating a steering wheel is detected, and to determine that the driver is carrying out hands-off driving when the no-operation state continuation period is more than a hands-off driving determination period. The hands-off determination unit is configured to take over, when the control mode is switched under a state in which the measurement of the no-operation state continuation period has been started, a value of the no-operation state continuation period that has been measured until the switching of the control mode, (Continued)

thereby continuing the measurement of the no-operation state continuation period.

4 Claims, 12 Drawing Sheets

DRIVING SUPPORT APPARATUS FOR VEHICLE

BACKGROUND OF THE INVENTION

1. Field of the Invention

The present invention relates to a driving support apparatus for a vehicle, which is configured to support driving of a driver so that a vehicle travels within a lane.

2. Description of the Related Art

Hitherto, there has been known a driving support apparatus for a vehicle, which is configured to carry out lane keep assist control and lane departure alert control. The lane keep assist control is control for supporting a steering operation of the driver by: detecting left and right white lines of a road with, for example, a camera sensor; setting a target travel line (e.g., a centerline at a center position of the left and right white lines) based on those left and right white lines; and applying a steering assist torque to a steering mechanism so that a travel position of an own vehicle is maintained near the target travel line.

On the other hand, the lane departure alert control is control for supporting the steering operation of the driver by applying a steering assist torque to a steering mechanism when the own vehicle is likely to depart from the travel lane (from the white line) so that the own vehicle does not depart from the travel lane. The lane keep assist control and the lane departure alert control are hereinafter collectively referred to as travel support control.

The driving support apparatus includes a lane keep assist control unit, which is a functional unit configured to carry out the lane keep assist control, and a lane departure alert control unit, which is a functional unit configured to carry out the lane departure alert control. A control mode in which the lane keep assist control unit carries out the lane keep assist control is hereinafter referred to as lane keep assist control mode. A control mode in which the lane departure alert control unit carries out the lane departure alert control is hereinafter referred to as lane departure alert control mode. The driving support apparatus is configured to be able to switch the control mode between the lane keep assist control mode and the lane departure alert control mode depending on the travel position of the vehicle.

The travel support control is different from automatic driving control in that the travel support control is only control of supporting the steering wheel operation of the driver so that the own vehicle does not depart from the target travel line or the travel lane, and is not control of completely eliminating necessity of the steering wheel operation of the driver. Thus, in a driving support apparatus proposed in Japanese Patent Application Laid-open No. 2014-142965, when a no-operation state in which a driver is estimated not to be operating a steering wheel continues while the travel support control is being carried out, hands-off driving handling processing is carried out. The hands-off driving handling processing includes at least one of stop of the application of the steering assist torque to the steering mechanism and notification of causing the driver to pay attention to the hands-off driving.

In general, the presence/absence of the steering wheel operation is determined based on a steering torque detected by a torque sensor provided on a steering shaft. When the steering torque is less than a threshold, it is determined that the steering wheel operation is not being carried out. The driving support apparatus is configured to measure a continuation period (referred to as no-operation state continuation period) in which the steering torque is less than the threshold, determine that the driver is carrying out a hands-off driving when the measured value reaches a set value, and carry out hands-off driving handling processing. The measurement of the no-operation state continuation period and the execution of the hands-off driving handling processing based on the measurement value are carried out by the lane keep assist control unit and the lane departure alert control unit independently of each other.

Incidentally, during the travel support control, the control mode is switched from the lane keep assist control mode to the lane departure alert control mode, or conversely, from the lane departure alert control mode to the lane keep assist control mode. Therefore, when the control mode is switched while the hands-off driving handling processing is being carried out, the control unit to carry out the control mode after the switching starts the count (measurement) of the no-operation state continuation period. In this case, the no-operation state continuation period is counted from an initial value. Thus, while the hands-off driving actually continues, the hands-off driving handling processing is finished when the control mode is switched. In other words, the application of the steering assist torque to the steering mechanism resumes, or the notification of alerting the driver to the hands-off driving is finished during the hands-off driving. Therefore, the hands-off driving handling processing may not be appropriately carried out.

SUMMARY OF THE INVENTION

The present invention has been made in view of the above-mentioned problem, and therefore has an object to appropriately carry out hands-off driving handling processing even when a control mode is switched.

In order to achieve the above-mentioned object, a feature of one embodiment of the present invention resides in a driving support apparatus for a vehicle, including:

lane keep assist control means for carrying out lane keep assist control, which is control for supporting a steering operation of a driver by applying a steering assist torque for keeping a travel position of an own vehicle near a target travel line to a steering mechanism;

lane departure alert control means for carrying out lane departure alert control, which is control for supporting a steering operation of the driver by applying a steering assist torque for preventing the own vehicle from departing from the travel lane to the steering mechanism;

mode switching means for switching a control mode between a lane keep assist control mode, which is a control mode in which the lane keep assist control means carries out the lane keep assist control, and a lane departure alert control mode, which is a control mode in which the lane departure alert control means carries out the lane departure alert control;

hands-off driving determination means for, in each of the lane keep assist control mode and the lane departure alert control mode, when a no-operation state in which the driver is estimated not to be operating a steering wheel is detected, starting measurement of a no-operation state continuation period, which is a continuation period in which the no-operation state is detected, and determining that the driver is carrying out hands-off driving when the no-operation state continuation period is more than a hands-off driving determination period; and hands-off driving handling processing means for carrying out hands-off driving handling processing set in advance when the driver is determined to be carrying out the hands-off driving, in which the hands-off driving determination means is configured to carry out one of taking over, when the control mode is switched under a state in which the measurement of the no-operation state continuation period has been started, a value of the no-operation state continuation period that has been measured until the switching of the control mode, thereby continuing the measurement of the no-operation state continuation period, and maintaining, when the control mode is switched under a state in which the driver is determined to be carrying out the hands-off driving, a result of the determination until the no-operation state is no longer detected (S53, S61, S62).

The driving support apparatus for a vehicle according to the one embodiment of the present invention is configured to switch between the lane keep assist control and the lane departure alert control for the execution. The lane keep assist control means is configured to carry out the lane keep assist control, which is the control for supporting the steering operation of the driver by applying the steering assist torque for keeping the travel position of the own vehicle near the target travel line to the steering mechanism. The lane departure alert control means is configured to carry out the lane departure alert control, which is the control for supporting the steering operation of the driver by applying the steering assist torque for preventing the own vehicle from departing from the travel lane to the steering mechanism. The mode switching means is configured to switch the control mode between the lane keep assist control mode, which is the control mode in which the lane keep assist control means carries out the lane keep assist control, and the lane departure alert control mode, which is the control mode in which the lane departure alert control means carries out the lane departure alert control. In other words, the mode switching means is configured to determine which of the lane keep assist control mode and the lane departure alert control mode is to be carried out, and to switch the mode to the determined mode.

The hands-off driving determination means is configured to, in each of the lane keep assist control mode and the lane departure alert control mode, when the no-operation state in which the driver is estimated not to be operating the steering wheel is detected, start the measurement of the no-operation state continuation period, which is the continuation period in which the no-operation state is detected, and to determine that the driver is carrying out the hands-off driving when the no-operation state continuation period is more than the hands-off driving determination period.

The hands-off driving handling processing means is configured to carry out the hands-off driving handling processing set in advance when the driver is determined to be carrying out the hands-off driving. For example, the hands-off driving handling processing means is configured to carry out at least one of processing of suspending the application of the steering assist torque to the steering mechanism and processing of issuing the hands-off alert notification to the driver. As a result, it is possible to prevent the driver from excessively trusting the driving support apparatus.

Under the state in which the hands-off driving handling processing is being carried out, when the control mode is switched and the measurement of the no-operation state continuation period is newly started, the measurement value of the no-operation state continuation period returns to the initial value, and even when the hands-off driving of the driver actually continues, the hands-off driving handling processing is finished when the control mode is switched. Thus, the hands-off driving determination means is configured to take over, when the control mode is switched under the state in which the measurement of the no-operation state continuation period has been started, the value of the no-operation state continuation period that has been measured until the switching of the control mode, thereby continuing the measurement of the no-operation state continuation period. Alternatively, when the control mode is switched under the state in which the driver is determined to be carrying out the hands-off driving, the hands-off driving determination means maintains the result of the determination until the no-operation state is no longer detected.

As a result, according to the present invention, even when the control mode is switched, the hands-off driving handling processing can be appropriately carried out.

Moreover, when the hands-off driving determination means is configured to take over, when the control mode is switched under the state in which the measurement of the no-operation state continuation period has been started, the value of the no-operation state continuation period that has been measured until the switching of the control mode, thereby continuing the measurement of the no-operation state continuation period, the no-operation state continuation period can be more appropriately measured. Thus, the determination processing of determining that the driver is carrying out the hands-off driving can be appropriately carried out.

A feature of one aspect of the present invention resides in that the hands-off driving determination means is configured to use a common timer to measure the no-operation state continuation period over both of the lane keep assist control mode and the lane departure alert control mode.

According to the one aspect of the present invention, even when the control mode is switched, the no-operation state continuation period is continuously measured. Thus, the determination processing of determining that the driver is carrying out the hands-off driving can be appropriately carried out.

A feature of one aspect of the present invention resides in a driving support apparatus for a vehicle, including:

a steering assist torque application device configured to apply a steering assist torque to a steering mechanism;

a first control unit configured to carry out lane keep assist control, which is control for supporting a steering operation of a driver by using the steering assist torque application device to apply a steering assist torque for keeping a travel position of an own vehicle near a target travel line to the steering mechanism; and a second control unit other than the first control unit, and configured to carry out lane departure alert control, which is control for supporting a steering operation of the driver by using the steering assist torque application device to apply a steering assist torque for preventing the own vehicle from departing from the travel lane to the steering mechanism, in which:

only one of the first control unit and the second control unit is configured to determine which of a lane keep assist control mode for carrying out the lane keep assist control and a lane departure alert control mode for carrying out the lane departure alert control is to be carried out, and to transmit a result of the determination to another one of the first control unit and the second control unit; and only one of the first control unit and the second control unit is configured to measure a no-operation state continuation period, in which a no-operation state in which the driver is estimated not to be operating a steering wheel, is detected over both of the lane keep assist control mode and the lane departure alert control mode, determine that the driver is carrying out hands-off driving when the no-operation state continuation period is more than a hands-off driving determination period, and carry out hands-off driving handling processing set in advance when the driver is determined to be carrying out the hands-off driving.

The driving support apparatus for a vehicle according to the one aspect of the present invention includes the steering assist torque application device, the first control unit, and the second control unit other than the first control unit. The first control unit is configured to carry out the lane keep assist control, which is the control supporting the steering operation of the driver by using the steering assist torque application device to apply the steering assist torque for keeping the travel position of the own vehicle near the target travel line to the steering mechanism. The second control unit is configured to carry out the lane departure alert control, which is the control for supporting the steering operation of the driver by using the steering assist torque application device to apply the steering assist torque for preventing the own vehicle from departing from the travel lane to the steering mechanism.

The one of the first control unit and the second control unit is configured to determine which of the lane keep assist control mode for carrying out the lane keep assist control and the lane departure alert control mode for carrying out the lane departure alert control is to be carried out, and to transmit the result of the determination to another one of the first control unit and the second control unit. Thus, even when the two control units are independently provided, the two pieces of support control carried out by the respective control units can be appropriately switched.

Moreover, the one of the first control unit and the second control unit is configured to measure the no-operation state continuation period in which the no-operation state, in which the driver is estimated not to be operating the steering wheel, is detected over both of the lane keep assist control mode and the lane departure alert control mode, determine that the driver is carrying out the hands-off driving when the no-operation state continuation period is more than the hands-off driving determination period, and carry out the hands-off driving handling processing set in advance when the driver is determined to be carrying out the hands-off driving.

Thus, even when the two pieces of support control carried out by the two control units are switched (even when the control mode is switched), the no-operation state continuation period can be appropriately measured. As a result, the determination processing of determining that the driver is carrying out the hands-off driving can be appropriately carried out.

Moreover, the function of measuring the no-operation state continuation period and the function of carrying out the hands-off driving handling processing do not need to be provided in another one of the two control units. Thus, another one of the two control units can be implemented at low cost.

In the above description, a reference numeral used in an embodiment of the present invention is enclosed in parentheses and is assigned to each of the constituent features of the invention corresponding to the embodiment in order to facilitate understanding of the invention. However, each of the constituent features of the invention is not limited to the embodiment defined by the reference numeral.

DETAILED DESCRIPTION OF THE PREFERRED EMBODIMENTS

Figure 1:
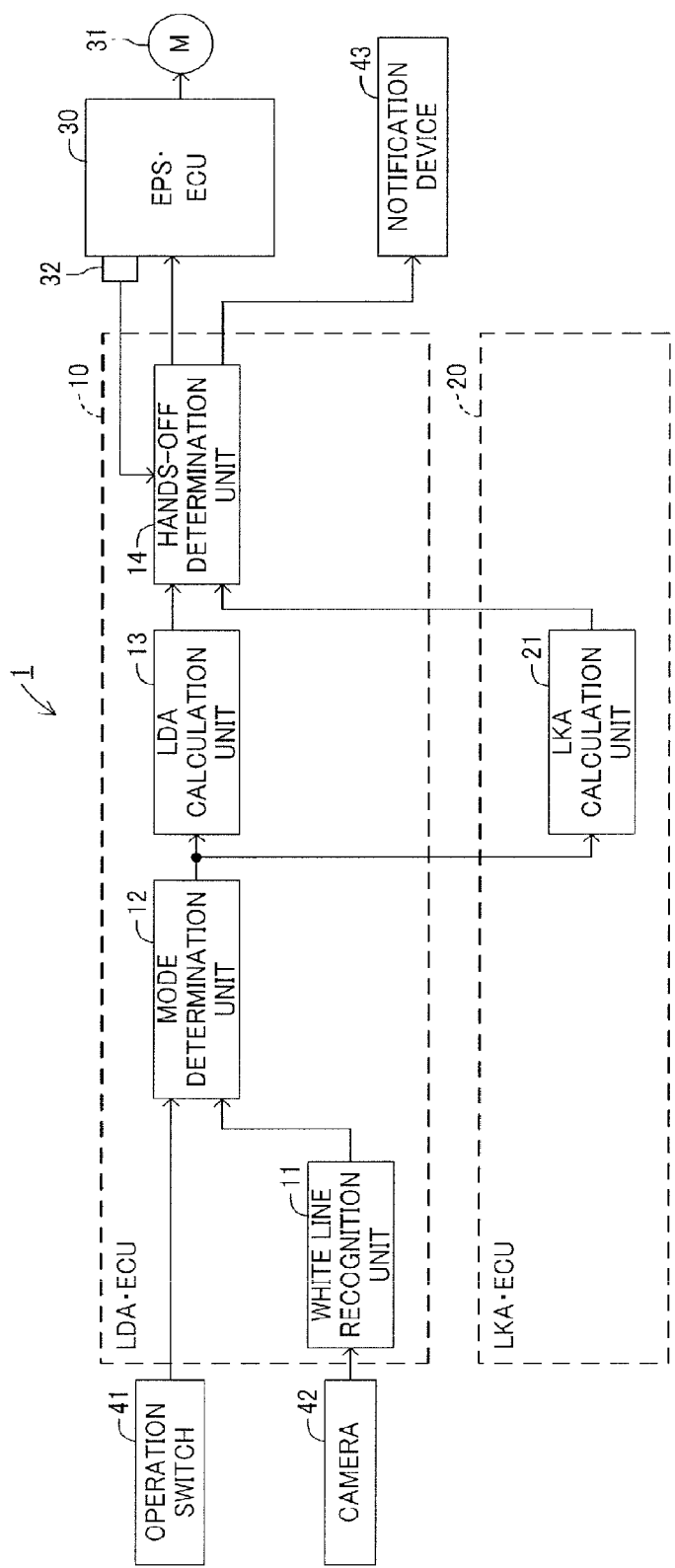
FIG. 1 is a schematic system configuration diagram for illustrating a driving support apparatus for a vehicle according to a first embodiment of the present invention.

Referring to the accompanying drawings, embodiments of the present invention are described in detail below. FIG. 1 is a schematic system configuration diagram for illustrating a driving support apparatus for a vehicle according to a first embodiment of the present invention.

The driving support apparatus 1 for a vehicle according to the first embodiment includes a lane departure alert ECU 10, a lane keep assist ECU 20, and an electric power steering ECU 30. The lane departure alert ECU 10, the lane keep assist ECU 20, and the electric power steering ECU 30 are hereinafter referred to as LDA-ECU 10, LKA-ECU 20, and EPS-ECU 30, respectively. "ECU" is an abbreviation for electric control unit.

The EPS-ECU 30 is a control device for an electric power steering device, and includes a microcomputer and a motor drive circuit as main components. The EPS-ECU 30 is configured to use a steering torque sensor 32 installed on a steering shaft to detect a steering torque input to a steering wheel (not shown) by a driver, and control the assist motor 31 for driving based on the steering torque to apply a steering torque to the steering mechanism, thereby supporting a steering operation of the driver. The electric power steering device is constructed by the EPS-ECU 30, the assist motor 31, and the steering torque sensor 32, and corresponds to a steering assist torque application device according to the present invention. The microcomputer herein includes a CPU and storage devices such as a ROM and a RAM, and the CPU is configured to implement various functions by executing instructions (programs) stored in the ROM.

The EPS-ECU 30 is connected to the LDA-ECU 10. The EPS-ECU 30 is configured to drive, when the EPS-ECU 30 receives a steering command from the LDA-ECU 10, the assist motor 31 at a control amount specified by the steering command, thereby generating the steering assist torque. This steering assist torque is different from a steering assist torque generated by the EPS-ECU 30 during the steering wheel operation of the driver in response to a steering wheel operation force (steering torque), and represents the torque applied to the steering mechanism by the steering command from the LDA-ECU 10 independently of the steering wheel operation force of the driver.

The LDA-ECU 10 includes a microcomputer as a main component, and is configured to carry out the lane departure alert control. The LDA-ECU 10 corresponds to a second control unit according to the present invention. The lane departure alert control is control for supporting the steering operation of the driver by applying the steering assist torque to the steering mechanism when the own vehicle is likely to depart from the travel lane (from the white line) so that the own vehicle does not depart from the travel lane. The LDA-ECU 10 is configured to carry out the lane departure alert control when the control mode is set to a lane departure alert control mode (hereinafter referred to as LDA mode). The LDA-ECU 10 is configured to calculate a target steering torque T* for preventing the own vehicle from departing from the travel lane, and transmit the steering command representing the target steering torque T* to the EPS-ECU 30 during the lane departure alert control.

The LKA-ECU 20 includes a microcomputer as a main component, and is configured to carry out the lane keep assist control. The LKA-ECU 20 corresponds to a first control unit according to the present invention. The lane keep assist control is control for supporting the steering operation of the driver by applying the steering assist torque to the steering mechanism so that the travel position of the own vehicle is maintained near the target travel line (e.g., a center position of the lane). The LKA-ECU 20 is provided independently of the LDA-ECU 10, and is connected so as to be able to communicate to/from the LDA-ECU 10. The LDA-ECU 20 is configured to carry out the lane keep assist control when the control mode is set to a lane keep assist control mode (hereinafter referred to as LKA mode) by the LDA-ECU 10. The LKA-ECU 20 is configured to calculate the target steering torque T* for maintaining the travel position of the own vehicle near the target travel line, and transmit the steering command representing the target steering torque T* to the EPS-ECU 30 via the LDA-ECU 10 during the lane keep assist control.

The LDA mode and the LKA mode are automatically switched depending on the travel position of the own vehicle and the like.

The LDA-ECU 10 is connected to an operation switch 41, a camera 42, and a notification device 43. The operation switch 41 is an operation device configured to be used by the driver to select the control to be carried out. For example, the driver uses the operation switch 41 to be able to select a mode from among a set mode (referred to as on mode) in which the lane keep assist control and the lane departure alert control are automatically selected for execution, a set mode (referred to as LKA off mode) in which the lane keep assist control is not carried out and only the lane departure alert control is carried out, and a set mode (referred to as off mode) in which neither the lane keep assist control nor the lane departure alert control is carried out.

The camera 42 is configured to photograph a front field of view of the own vehicle, and transmit image data acquired by the photographing to the LDA-ECU 10. The notification device 43 includes a display and a buzzer, which are not shown. The display is provided at a position allowing the driver seated in a driver seat to view the display, and is configured to display assist control information transmitted from the LDA-ECU 10 on a screen. The buzzer sounds based on alert command transmitted from the LDA-ECU 10, thereby causing the driver to be alerted.

Figure 2:
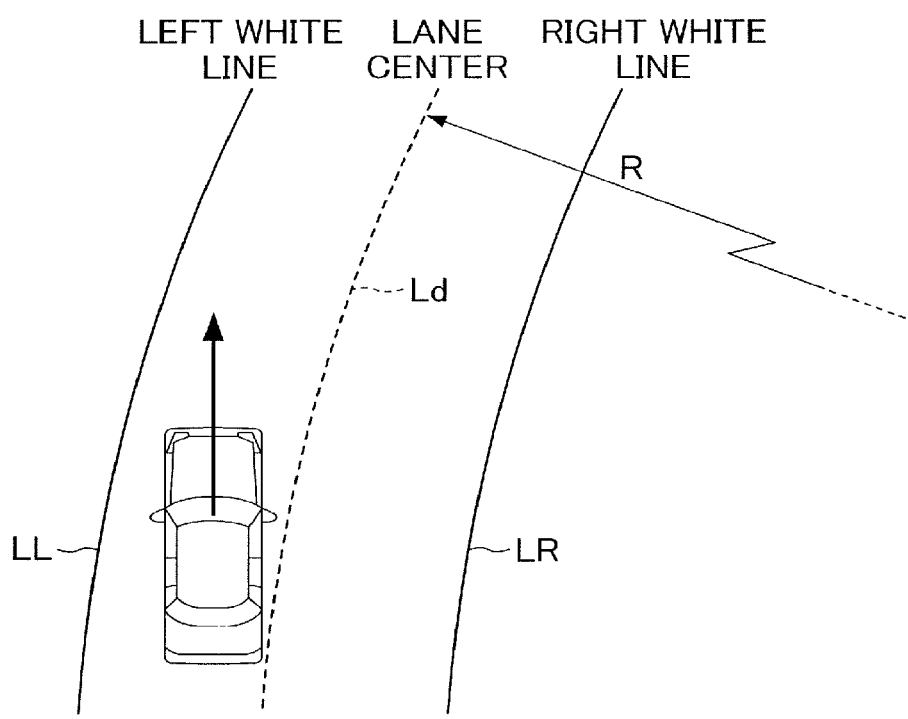
FIG. 2 is a plan view for illustrating left and right white lines LL and LR, a target travel line Ld, and a curve radius R.

The LDA-ECU 10 includes a white line recognition unit 11, a mode determination unit 12, an LDA calculation unit 13, and a hands-off determination unit 14. The white line recognition unit 11 is configured to analyze the image data transmitted from the camera 42, and recognize (detect) left and light white lines of a road. As illustrated in FIG. 2, for example, the white line recognition unit 11 is configured to recognize a left white line LL and a right white line LR, and set a lane center line, which is at a center position between the left and right white lines LL and LR, as a target travel line Ld. Moreover, the white line recognition unit 11 is configured to calculate a curve radius R of the target travel line Ld. The target travel line Ld does not need to be set at the center position between the left and right white lines, and may be set to a position shifted leftward or rightward by a predetermined distance from the center position.

The lane keep assist control is control carried out by applying the steering assist torque to the steering mechanism so that the travel position of the own vehicle is maintained near the target travel line Ld. Moreover, the lane departure alert control is control carried out by applying the steering assist torque to the steering mechanism so that the travel position of the own vehicle is prevented from departing from the left white line LL and the right white line LR.

Figure 3:
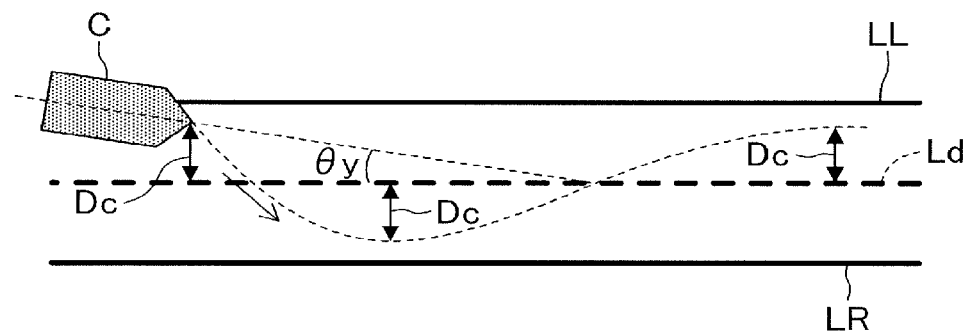
FIG. 3 is a plan view for illustrating a center distance Dc and a yaw angle θy, which are lane information to be used when lane keep assist control is carried out.
Figure 4:
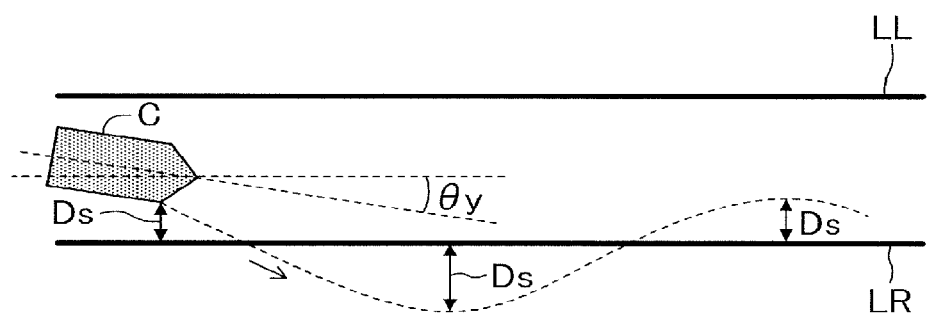
FIG. 4 is a plan view for illustrating a side distance Ds and the yaw angle θy, which are lane information to be used when lane departure alert control is carried out.

The white line recognition unit 11 is configured to calculate a position and a direction of the own vehicle in the travel lane partitioned by the left white line LL and the right white line LR. For example, as illustrated in FIG. 3, the white line recognition unit is configured to calculate a distance Dc (referred to as center distance Dc) between a center position at a front end of the own vehicle C and the target travel line Ld in a road widthwise direction, and a deviation angle θy (hereinafter referred to as yaw angle θy) between the direction of the target travel line Ld and the direction of the own vehicle C. Moreover, as illustrated in FIG. 4, the white line recognition unit 11 is configured to calculate respective distances Ds (referred to as side distances Ds) between the front right wheel of the own vehicle C and the right white line LR and between the front left wheel of the own vehicle C and the left white line LL. In FIG. 4, only the side distance Ds between the front right wheel and the right white line LR is illustrated. The values Dc, Ds, θy, and R calculated by the white line recognition unit 11 are referred to as lane information.

The shape of the target travel line Ld can be calculated only under a state in which the left white line LL and the right white line LR are detected. Thus, the lane keep assist control can be carried out only when the left white line LL and the right white line LR are detected. Moreover, when only one of the left white line LL and the right white line LR is detected, the lane departure alert control can be carried out for the detected white line LL or LR.

The line information is supplied to the mode determination unit 12. The mode determination unit 12 is configured to determine the control mode (LDA mode or LKA mode) based on the set mode set by the operation switch 41 and the lane information supplied from the white line recognition unit 11. When the set mode set by the operation switch 41 is the off mode, or neither the left white line LL nor the right white line LR is detected, neither the lane keep assist control nor the lane departure alert control is carried out. Thus, a description of those cases is omitted here.

The mode determination unit 12 is configured to, under a state in which the on mode is set by the operation switch 41, and both the left white line LL and the right white line LR are detected, set the control mode to the LKA mode when an LKA intervention condition described later is satisfied, and set the control mode to the LDA mode when an LDA intervention condition described later is satisfied. Moreover, when the LKA off mode is set by the operation switch 41, or when the on mode is set by the operation switch 41 but one of the left white line LL and the right white line LR is not detected, the mode determination unit 12 sets the control mode to the LDA mode.

Figure 5:
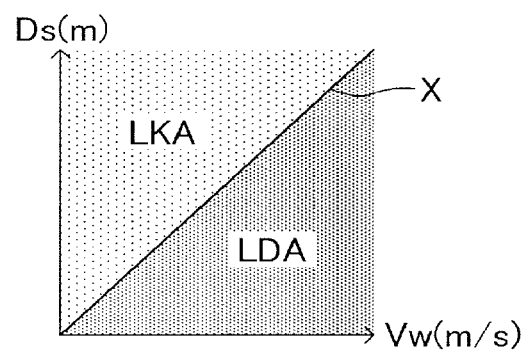
FIG. 5 is a graph for showing a mode determination map.

A description is now given of the LKA intervention condition and the LDA intervention condition. The mode determination unit 12 stores a mode determination map shown in FIG. 5. The mode determination map is a map for determining the control mode based on a relationship between an approach speed Vw at which a subject front wheel, which is approaching the left or right white line, approaches the white line and the side distance Ds between the subject front wheel and the white line. The approach speed Vw is a time derivative of the side distance Ds between the front wheel and the white line. In the map, a range on a right side of a switching line X and painted in dark gray represents an LDA region where the LDA mode is set, and a range on a left side of the switching line X and painted in light gray represents an LKA region where the LKA mode is set.

In this mode determination map, as the approach speed Vw increases, or the side distance Ds decreases, the control mode is more likely to be set to the LDA mode more. Conversely, as the approach speed Vw decreases or the side distance Ds increases, the control mode is more likely to be set to the LKA mode. This mode determination map is a map used to determine the control mode for a case in which the front wheel is located inside the white line, but when the front wheel is departed from the white line (Ds<0), the control mode is set to the LDA mode.

The control mode does not always need to be set based on both the side distance Ds and the approach speed Vw, and only needs to be set based on, for example, at least one of the side distance Ds and the approach speed Vw. In a case in which the side distance Ds is used, when the side distance Ds is more than a reference value, the control mode only needs to be determined to be the LKA mode, whereas when the side distance Ds is equal to or less than the reference value, the control mode only needs to be determined to be the LDA mode. In a case in which the approach speed Vw is used, when the approach speed Vw is less than a reference value, the control mode only needs to be determined to be the LKA mode, whereas when the approach speed Vw is equal to or more than the reference value, the control mode only needs to be determined to be the LDA mode.

After the mode determination unit 12 determines the control mode, the mode determination unit 12 outputs mode determination information representing the determined control mode, and the lane information (Dc, Ds, θy, and R) supplied from the white line recognition unit 11. The information output by the mode determination unit 12 is supplied to the LDA calculation unit 13 and the LKA-ECU 20.

When the mode determination information represents the LDA mode, the LDA calculation unit 13 calculates a target lateral acceleration Gys* based on the lane information, for example, in accordance with Equation (1).

$$Gys^* = K1 \times Ds' + K2 \times \theta y + K3 \times v \tag{1}$$

In Equation (1), K1, K2, and K3 are respectively control gains. Moreover, v is a road curvature (=1/R). The target lateral acceleration Gys* is a lateral acceleration set so that the own vehicle does not depart from the white line. Moreover, Ds' is set in correspondence to the side distance Ds, that is, set to decrease as the front wheel inside the white line subject to the departure alert (on a center side of the road) departs from the white line toward the inside (as Ds increases), and is set to increase as the front wheel outside the white line subject to the departure alert departs from the white line toward the outside. For example, when the side distance Ds for the case in which the front wheel is located outside the white line subject to the departure alert is represented as a negative value, a value acquired by subtracting the side distance Ds from a reference side distance Dsref set in advance only needs to be set to Ds' (Ds'=Dsref−Ds).

Figure 6:
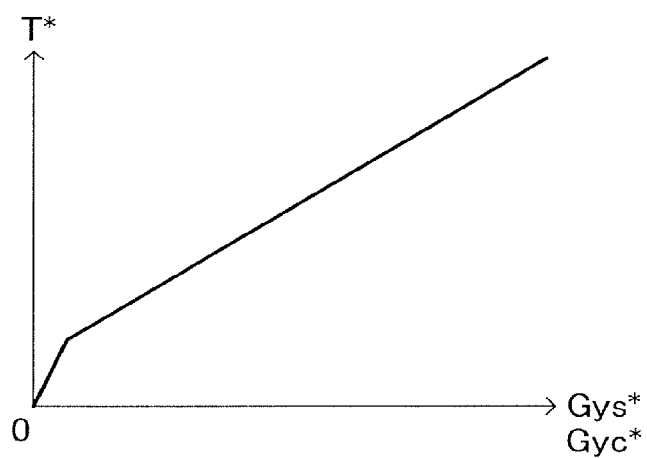
FIG. 6 is a graph for showing a target torque conversion map.

The LDA calculation unit 13 refers to a target torque conversion map shown in FIG. 6 based on the target lateral acceleration Gys*, thereby calculating the target steering torque T*. The target steering torque T* is a control amount for carrying out the lane departure alert control. The LDA calculation unit 13 supplies the target steering torque T* to the hands-off determination unit 14.

The LKA-ECU 20 includes an LKA calculation unit 21. The LKA calculation unit 21 is configured to calculate, when the mode determination information transmitted from the mode determination unit 12 represents the LKA mode, a target lateral acceleration Gyc* based on the lane information, for example, in accordance with Equation (2).

$$Gyc^* = K4 \times Dc + K5 \times \theta y + K6 \times v \tag{2}$$

In Equation (2), K4, K5, and K6 are respectively control gains. The target lateral acceleration Gyc* is a lateral acceleration set so that the own vehicle can travel along the target travel line Ld.

The LKA calculation unit 21 refers to a target steering angle conversion map shown in FIG. 6 based on the target lateral acceleration Gyc*, thereby calculating the target steering torque T*. The target steering torque T* is a control amount for carrying out the lane keep assist control. The LKA calculation unit 21 supplies the target steering torque T* to the hands-off determination unit 14 of the LDA-ECU 10.

In this embodiment, the target lateral accelerations Gys* and Gyc* are calculated based on the lane information. However, a target yaw rate may be calculated based on the lane information, and the target steering torque T* for providing this target yaw rate may be calculated. Moreover, the target steering torque T* may be corrected through feedback control based on a deviation between the target lateral acceleration Gys* or Gyc* and an actually detected lateral acceleration, or based on a deviation between the target yaw rate and an actually detected yaw rate.

The hands-off determination unit 14 is configured to determine whether the driver is carrying out the hands-off driving, and transmit the steering command representing the target steering torque T* supplied by the LDA calculation unit 13 or the LKA calculation unit 21 to the EPS-ECU 30 while the driver is not determined to be carrying out the hands-off driving. The EPS-ECU 30 is configured to control, when the EPS-ECU 30 receives the steering command, the assist motor 31 for driving so as to generate the target steering torque T*. As a result, steered wheels are steered so that the travel position of the own vehicle is maintained near the target travel line Ld, or the own vehicle is prevented from departing from the left and right white lines LL and LR.

The hands-off determination unit 14 is connected to the steering torque sensor 32. The steering torque sensor 32 is configured to output a detection signal corresponding to a steering torque input by the driver to the steering wheel. The detection signal of the steering torque sensor 32 is used for a case in which the EPS-ECU 30 carries out the steering assist control. The hands-off determination unit 14 is configured to measure a no-operation state continuation period representing a continuation period in which the steering torque is equal to or less than a no-operation determination threshold (e.g., zero) based on the steering torque detected by the steering torque sensor 32, and determine that the driver is carrying out the hands-off driving when the no-operation state continuation period is more than a hands-off driving determination period set in advance.

The hands-off determination unit 14 is configured to use a common timer both in the LDA control mode and the LKA control mode to measure the no-operation state continuation period.

The hands-off determination unit 14 is configured to stop transmission of the steering command to the EPS-ECU 30 during the period in which the driver is determined to be carrying out the hands-off driving. Thus, the lane departure alert control or the lane keep assist control is suspended in this period. Moreover, the hands-off determination unit 14 is configured to transmit a hands-off alert command to the notification device 43 during the period in which the driver is determined to be carrying out the hands-off operation. The notification device 43 is configured to, when the notification device 43 receives the hands-off alert command, for example, cause the display to display a flickering mark of the steering wheel, and cause the buzzer to sound.

Figure 7:
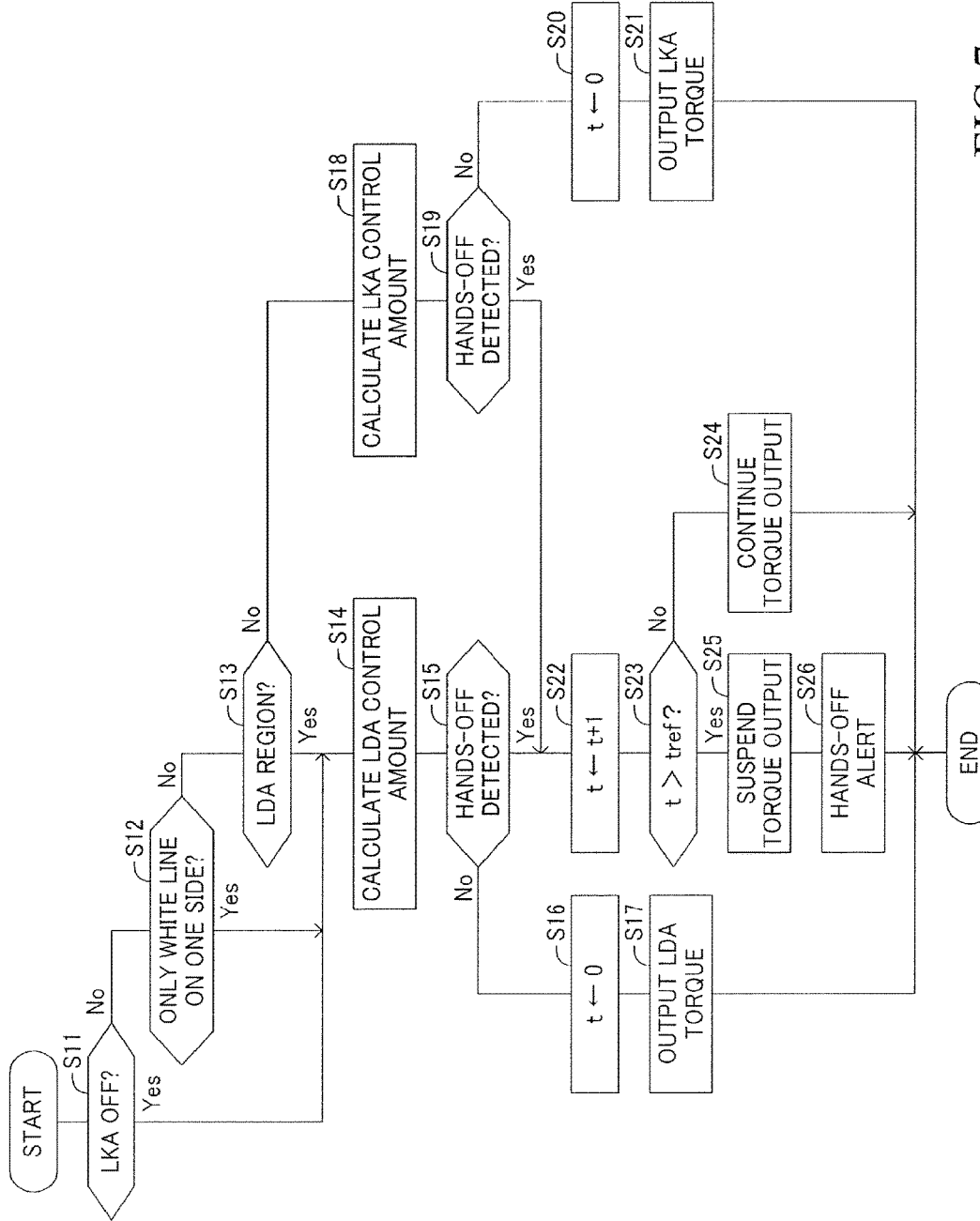
FIG. 7 is a flowchart for illustrating a driving support control routine.

A description is now given of overall processing of driving support control carried out by the LDA-ECU 10 and the LKA-ECU 20. The driving support control is carried out mainly by the LDA-ECU 10. FIG. 7 is a flowchart for illustrating a driving support control routine executed by the LDA-ECU 10. The driving support control routine is repeated at a predetermined calculation cycle while an ignition switch is turned on. When the set mode set by the operation switch 41 is the off mode, or neither the left white line LL nor the right white line LR is detected, neither the lane keep assist control nor the lane departure alert control is carried out. Thus, this case is handled in accordance with a flowchart (not shown) other than this flowchart.

When the driving support control routine starts, in Step S11, the LDA-ECU 10 determines whether the set mode set by the operation switch 41 is the LKA off mode. When the set mode is the LKA off mode, the LDA-ECU 10 advances the processing to Step S14 in order to carry out the lane departure alert control. On the other hand, when the set mode is not the LKA off mode, that is, when the set mode is the on mode, the LDA-ECU 10 advances the processing to Step S12. In Step S12, the LDA-ECU 10 determines whether only one (left white line LL or right white line LR) of the left and right white lines formed on the road is detected. When only one of the left and right white lines is detected, the LDA-ECU 10 advances the processing to Step S14 in order to carry out the lane departure alert control. When both the left and right white lines are detected, the LDA-ECU 10 advances the processing to Step S13.

In Step S13, the LDA-ECU 10 refers to the mode determination map (FIG. 6) to determine whether the travel state (Vw and Ds) of the own vehicle is in the LDA region. When the travel state (Vw and Ds) of the own vehicle is in the LDA region, the LDA-ECU 10 advances the processing to Step S14 in order to carry out the lane departure alert control. When the travel state (Vw and Ds) of the own vehicle is in the LKA region, the LDA-ECU 10 advances the processing to Step S18 in order to carry out the lane keep assist control.

The processing in Step S11 to Step S13 is processing carried out by the white line recognition unit 11 and the mode determination unit 12.

In Step S14, the LDA-ECU 10 calculates the target steering torque T*, which is the control amount for carrying out the lane departure alert control. This processing is the processing carried out by the white line recognition unit 11 and the LDA calculation unit 13. Then, in Step S15, the LDA-ECU 10 estimates whether the driver is keeping the hands off the steering wheel (whether the driver is not operating the steering wheel). In this case, the LDA-ECU 10 determines whether the steering torque detected by the steering torque sensor 32 is equal to or less than the no-operation determination threshold (e.g., zero). When the LDA-ECU 10 determines that the driver is not keeping the hands off the steering wheel (No in Step S15), in Step S16, the LDA-ECU 10 resets a timer count value t (t=0).

The timer count value t represents a continuation period of the no-operation state in which the driver is estimated not to be operating the steering wheel, namely, a no-operation state continuation period in which the steering torque is equal to or less than the no-operation determination threshold.

Then, in Step S17, the LDA-ECU 10 transmits the steering command representing the target steering torque T* to the EPS-ECU 30. As a result, the steered wheels are steered so that the own vehicle does not depart from the travel lane. In other words, the lane departure alert control is carried out.

On the other hand, when the processing proceeds to Step S18, the LDA-ECU 10 causes the LKA-ECU 20 to calculate the target steering torque T*, which is the control amount for carrying out the lane keep assist control. The LKA-ECU 20 reads the mode determination information and the lane information transmitted from the LDA-ECU 10 at a predetermined calculation cycle, and uses the lane information to calculate the target steering torque T*, which is the control amount for carrying out the lane keep assist control. Thus, the processing in Step S18 carried out by the LDA-ECU 10 includes the processing by the mode determination unit 12 of transmitting the mode determination information and the lane information to the LKA-ECU 20 and the processing by the hands-off determination unit 14 of receiving the target steering torque T* transmitted from the LKA-ECU 20.

Then, in Step S19, the LDA-ECU 10 estimates whether the driver is keeping the hands off the steering wheel. This processing is the same as the processing in Step S15. When the LDA-ECU 10 determines that the driver is not keeping the hands off the steering wheel (No in Step S19), in Step S20, the LDA-ECU 10 resets the timer count value t (t=0). Then, in Step S21, the LDA-ECU 10 transmits the steering command representing the target steering torque T* calculated in Step S18 to the EPS-ECU 30. As a result, the steered wheels are steered so that the travel position of the own vehicle is maintained near the target travel line. In other words, the lane keep assist control is carried out.

The LDA-ECU 10 repeats those pieces of processing at a predetermined calculation cycle. During the processing, when the LDA-ECU 10 detects the state in which the driver is estimated to be keeping the hands off the steering wheel (the state in which the steering torque is equal to or less than the no-operation determination threshold) (Yes in Step S15 or Yes in Step S19), in Step S22, the LDA-ECU 10 increments the timer count value t by "1". An initial value of the timer count value t is set to zero.

Then, in Step S23, the LDA-ECU 10 determines whether the timer count value t is more than a hands-off driving determination period tref. When the timer count value t is equal to or less than the hands-off driving determination period tref (No in Step S23), in Step S24, the LDA-ECU 10 transmits the steering command representing the target steering torque T* calculated in Step S14 or Step S18 to the EPS-ECU 30. Thus, the lane departure alert control or the line keep assist control is maintained.

While the state in which the driver is keeping the hands off the steering wheel continues, the timer count value t increases. Then, when the timer count value t becomes more than the hands-off operation determination period tref (Yes in Step S23), the LDA-ECU 10 determines that the driver is carrying out the hands-off driving. In the case in which the steering wheel operation is not temporarily detected, the LDA-ECU 10 does not determine that the driver is carrying out the hands-off driving. However, the LDA-ECU 10 determines that the driver is carrying out the hands-off operation when the state in which the steering wheel operation is not detected continues for a period equal to or more than the certain period (t>tref).

When the LDA-ECU 10 determines that the driver is carrying out the hands-off driving, in Step S25, the LDA-ECU 10 suspends transmission of the steering command representing the target steering torque T*. Thus, the lane departure alert control or the line keep assist control is suspended. Then, in Step S26, the LDA-ECU 10 transmits the hands-off alert command to the notification device 43. As a result, the buzzer sounds, and the hands-off alert indication (e.g., the flickering of steering wheel mark) is displayed on the display. The processing in Steps S25 and S26 corresponds to hands-off driving handling processing according to the present invention. The processing in Steps S25 and S26 may be hereinafter referred to as hands-off driving handling processing.

The LDA-ECU 10 repeats this processing at a predetermined calculation cycle. Thus, the lane departure alert control or the lane keep assist control is resumed at a time point when the steering wheel operation of the driver is detected (No in Step S15 or No in Step S19), and the timer count value t is reset.

The processing in Step S15 to Step S17 and Step S19 to Step S26 in the driving support control routine is processing carried out by the hands-off determination unit 14.

The driving support apparatus 1 for a vehicle of the first embodiment described above includes the LDA-ECU 10 configured to carry out the lane departure alert control and the LKA-ECU 20 configured to carry out the lane keep assist control independently of one another. Then, the white line recognition unit 11, the mode determination unit 12, and the hands-off determination unit 14, which are required in both the control, are provided only in the LDA-ECU 10, and are not provided in the LKA-ECU 20. Thus, the LDA-ECU 10 can be used, for example, both for a vehicle having only the lane departure alert control function and a vehicle having the lane keep assist control function and the lane departure alert control function. In this case, on the latter vehicle, the LKA-ECU 20 only needs to be connected to the LDA-ECU 10 used for the former vehicle. As a result, the component (LDA-ECU 10) can be used in common for a low cost installation.

In the configuration including the LDA-ECU 10 and the LKA-ECU 20, the steering command output by the LKA-ECU 20 is transmitted to the EPS-ECU 30 via the hands-off determination unit 14 of the LDA-ECU 10. The count of the timer count value t continues without being stopped while the hands-off state of the driver (no-operation state) is detected over both the control modes in the hands-off determination unit 14. In other words, while the hands-off state of the driver is being detected, the measurement value of the no-operation state continuation period is not reset even when the control mode is switched, and the value of the no-operation state continuation period that has been measured until the switching of the control mode is taken over as it is, and the measurement of the no-operation state continuation period continues (S15→S22 and S19→S22). Then, when the timer count value t becomes more than the hands-off driving determination period tref, the driver is determined to be carrying out the hands-off driving, and the hands-off driving handling processing (stop of the transmission of the steering command to the EPS-ECU 30, and transmission of the hands-off alert command to the notification device 43) is carried out.

Thus, even when the control mode is switched during the hands-off driving handling processing, the hands-off driving handling processing continues until the hands-off state is no longer detected. Therefore, the alert by the notification device is not stopped, or the output of the steering assist torque is not started while the driver is carrying out the hands-off driving, and the driver can be prevented from feeling a sense of discomfort.

Figure 8:
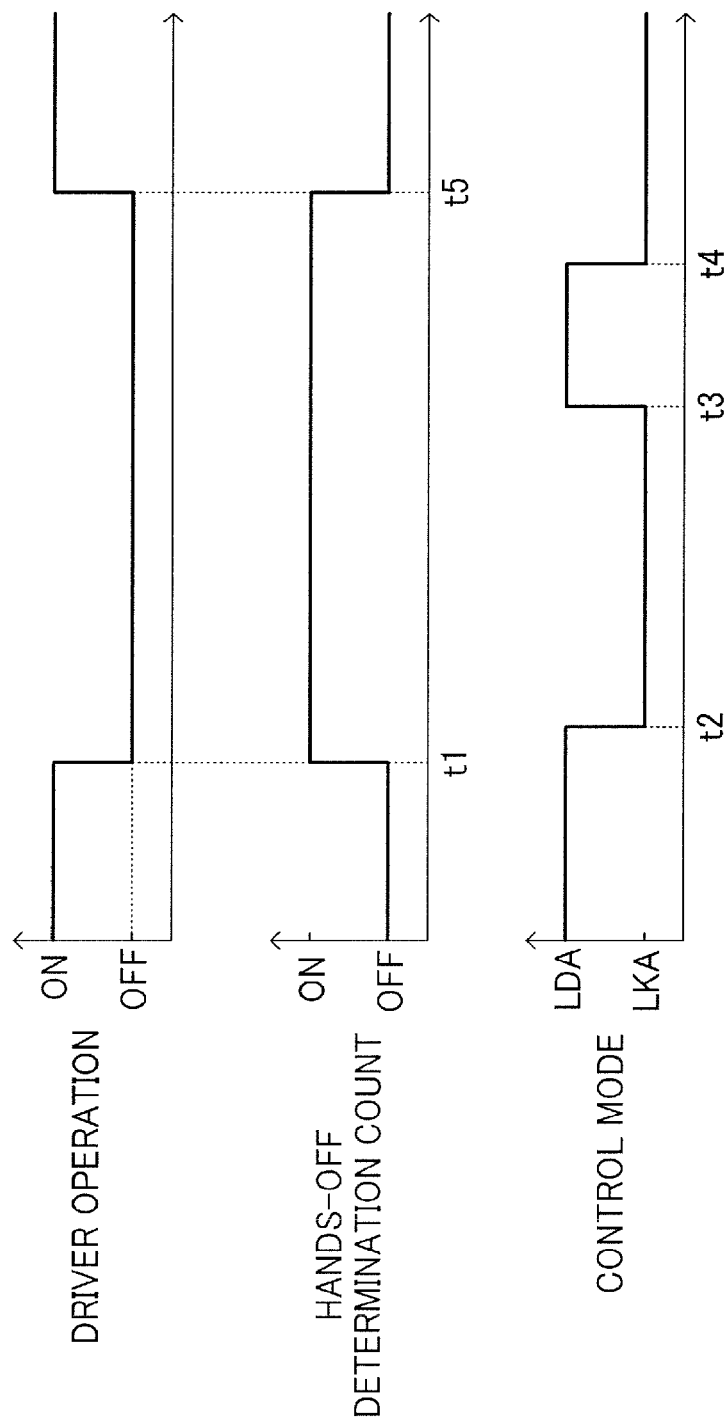
FIG. 8 is a timing chart for illustrating a steering operation of a driver, a time count for a hands-off state, and timings at which a control mode is switched.

Moreover, the measurement of the no-operation state continuation period, namely, the count of the timer count value t is continued regardless of the presence/absence of the switching of the control mode. For example, as illustrated in FIG. 8, the count of the timer count value t is started at a time point t1 at which the state in which the operation of the driver is not detected starts. The count of the timer count value t is continued through time points t2, t3, and t4 at which the control mode is switched unless the driver operates the steering wheel. Then, when the operation of the steering wheel is detected at a time point t5, the count of the timer count value t is stopped, and the timer count value t is reset. As a result, the period in which the steering wheel is not operated can be appropriately measured, and the hands-off driving can thus be detected at an appropriate timing.

Comparative Example

Figure 12:
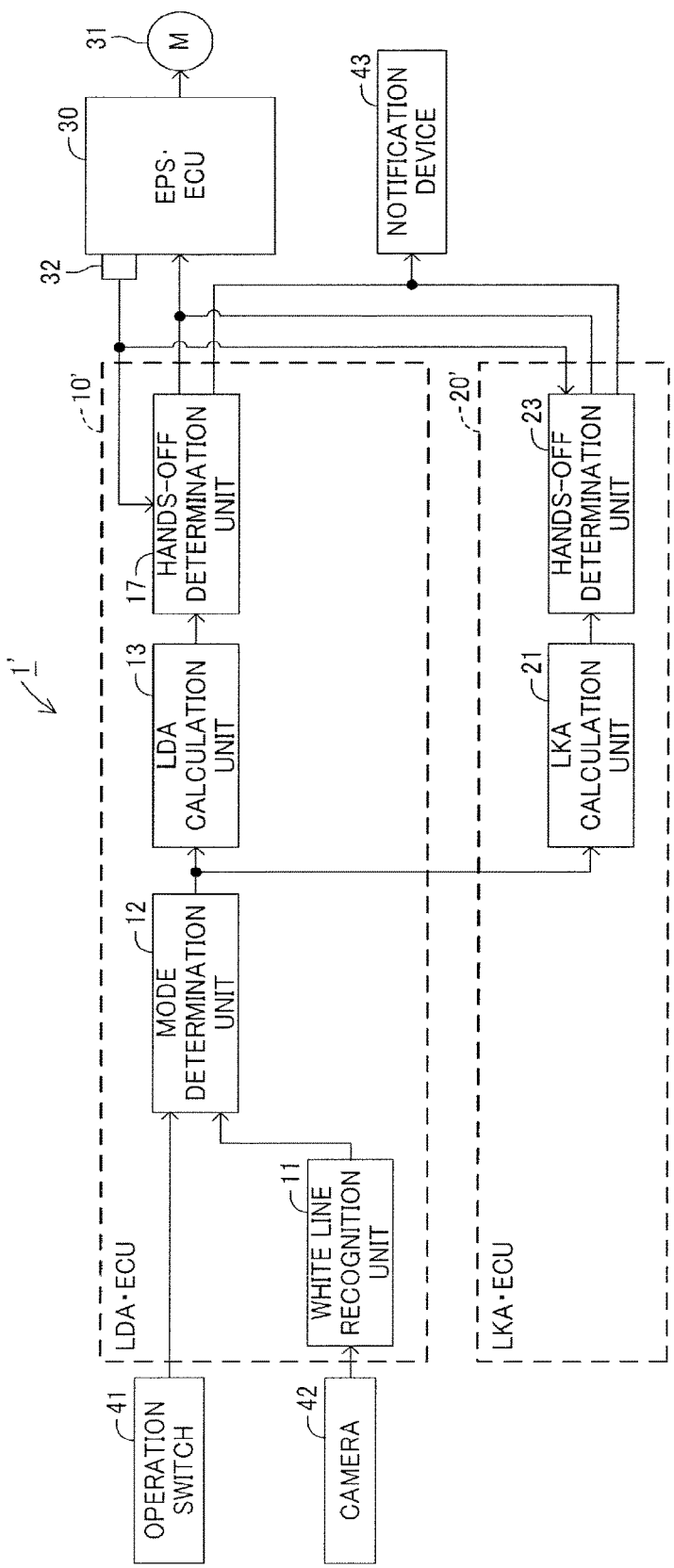
FIG. 12 is a schematic system configuration diagram for illustrating a driving support apparatus for a vehicle according to a comparative example.

Now, the driving support apparatus 1 for a vehicle of the first embodiment and a driving support apparatus for a vehicle of a comparative example are compared with each other. FIG. 12 is a diagram for illustrating a schematic configuration of a driving support apparatus 1' for a vehicle of the comparative example. The driving support apparatus 1' for a vehicle is not an embodiment of the present invention. The driving support apparatus 1' for a vehicle of the comparative example includes an LDA-ECU 10' in place of the LDA-ECU 10 of the first embodiment, and an LKA-ECU 20' in place of the LKA-ECU 20 of the first embodiment. The LDA-ECU 10' includes a hands-off determination unit 17 in place of the hands-off determination unit 14 in the LDA-ECU 10 of the first embodiment. The LKA-ECU 20' is constructed by adding a hands-off determination unit 23 to the LKA-ECU 20 of the first embodiment. In the drawings, the same configurations as those of the first embodiment are denoted by the same reference numerals as those of the first embodiment, and a description thereof is therefore omitted.

The hands-off determination unit 17 and the hands-off determination unit 23 are both connected to the EPS-ECU 30, the notification device 43, and the steering torque sensor 32. The hands-off determination unit 17 and the hands-off determination unit 23 include separate timers. The no-operation state continuation period in which the steering torque is equal to or less than the no-operation determination threshold is measured by those timers, and when the no-operation state continuation period is more than the hands-off driving determination period, the driver is determined to be carrying out the hands-off driving.

The hands-off determination unit 17 is configured to operate when the LDA control mode is set, and when the driver is not determined to be carrying out the hands-off driving, transmit the steering command representing the target steering torque T* calculated by the LDA calculation unit 13 to the EPS-ECU 30. Moreover, the hands-off determination unit 17 is configured to carry out, when the driver is determined to be carrying out the hands-off driving, the hands-off driving handling processing (stop of the transmission of the steering command to the EPS-ECU 30, and transmission of the hands-off alert command to the notification device 43).

The hands-off determination unit 23 is configured to operate when the LKA control mode is set, and when the driver is not determined to be carrying out the hands-off driving, transmit the steering command representing the target steering torque T* calculated by the LKA calculation unit 21 to the EPS-ECU 30. Moreover, the hands-off determination unit 23 is configured to carry out the hands-off driving handling processing when the driver is determined to be carrying out the hands-off driving.

In the driving support apparatus 1' for a vehicle of the comparative example, when the control mode is switched by the mode determination unit 12 under the state in which the hands-off driving handling processing is carried out, the hands-off determination unit (17 or 23) of the ECU (LDA-ECU 10' or LKA-ECU 20') carrying out the control mode after the switching starts the measurement of the no-operation state continuation period. In this case, the no-operation state continuation period is counted from the initial value. Thus, while the hands-off driving actually continues, the hands-off driving handling processing is finished when the control mode switches. Thus, the driver feels the sense of discomfort for the suspension of the hands-off driving handling processing although the driver is continuing the hands-off driving.

Moreover, in the driving support apparatus 1' for a vehicle of the comparative example, when the control mode is switched under the state (no-operation state) in which the driver is keeping the hands off the steering wheel, and the no-operation state continuation period is not more than the hands-off driving determination period, the measured no-operation state continuation period is not taken over to the other hands-off determination unit 17 (23). Therefore, when the no-operation state of the driver continues over the two control modes, the period from the determination of the hands-off operation to the suspension of the travel support control increases. For example, when the control mode is alternately switched at an interval shorter than the hands-off driving determination period, the hands-off driving of the driver cannot be detected for all time.

In contrast, by the driving support apparatus 1 for a vehicle of the first embodiment, as described above, even when the control mode is switched, the count of the timer count value t continues without being stopped while the hands-off state of the driver is being detected. Thus, all of those problems are solved.

Second Embodiment

Figure 9:
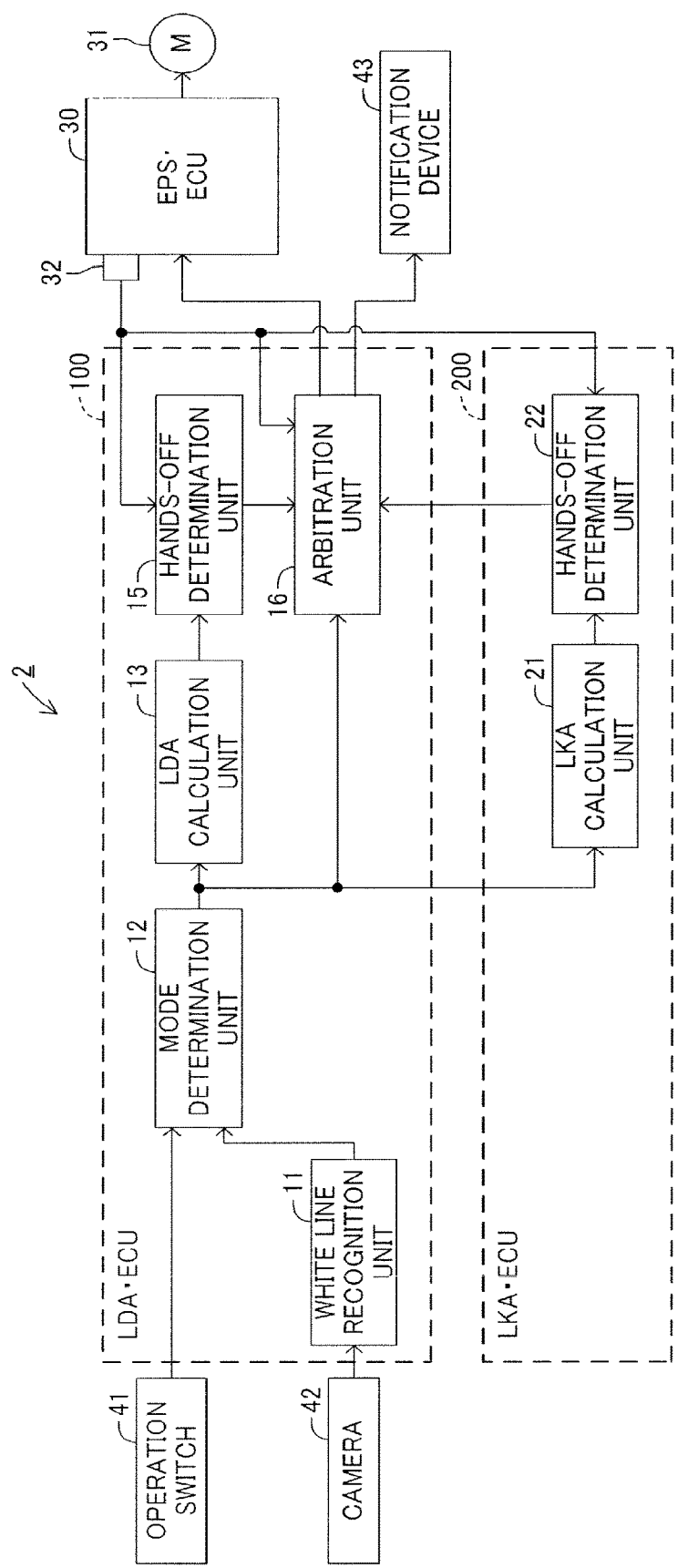
FIG. 9 is a schematic system configuration diagram for illustrating a driving support apparatus for a vehicle according to a second embodiment of the present invention.

A description is now given of a driving support apparatus for a vehicle according to a second embodiment of the present invention. FIG. 9 is a diagram for illustrating a schematic configuration of a driving support apparatus 2 for a vehicle according to the second embodiment.

The driving support apparatus 2 for a vehicle according to the second embodiment includes an LDA-ECU 100 in place of the LDA-ECU 10 of the first embodiment, and an LKA-ECU 200 in place of the LKA-ECU 20 of the first embodiment. The LDA-ECU 100 includes a hands-off determination unit 15 and an arbitration unit 16 in place of the hands-off determination unit 14 in the LDA-ECU 10 of the first embodiment. The LKA-ECU 200 is constructed by adding a hands-off determination unit 22 to the LKA-ECU 20 of the first embodiment. In the drawings, the same configurations as those of the first embodiment are denoted by the same reference numerals as those of the first embodiment, and a description thereof is therefore omitted.

The hands-off determination unit 15 is connected to the steering torque sensor 32 and the arbitration unit 16. The hands-off determination unit 22 is connected to the steering torque sensor 32 and the arbitration unit 16. The hands-off determination unit 15 and the hands-off determination unit 22 include separate timers. The no-operation state continuation period in which the steering torque is equal to or less than the no-operation determination threshold is measured by those timers, and when the no-operation state continuation period is more than the hands-off driving determination period, the driver is determined to be carrying out the hands-off driving.

The hands-off determination unit 15 is configured to operate when the LDA control mode is set, transmit, when the driver is not determined to be carrying out the hands-off driving, the steering command representing the target steering torque T* calculated by the LDA calculation unit 13 to the arbitration unit 16, and when the driver is determined to be carrying out the hands-off driving, stop the transmission of the steering command to the arbitration unit 16 and transmit the hands-off alert command to the arbitration unit 16.

The hands-off determination unit 22 is configured to operate when the LKA control mode is set, transmit, when the driver is not determined to be carrying out the hands-off driving, the steering command representing the target steering torque T* calculated by the LDA calculation unit 21 to the arbitration unit 16, and when the driver is determined to be carrying out the hands-off driving, stop the transmission of the steering command to the arbitration unit 16 and transmit the hands-off alert command to the arbitration unit 16.

Figure 10:
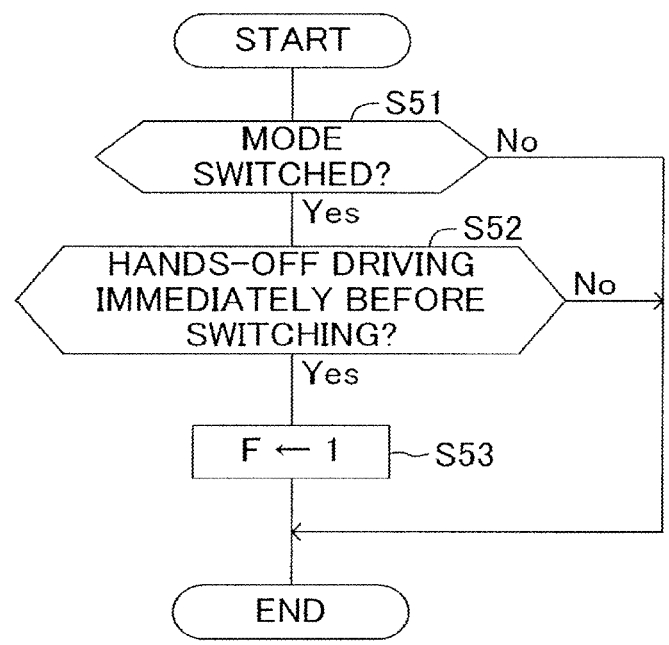
FIG. 10 is a flowchart for illustrating a flag setting routine according to the second embodiment.
Figure 11:
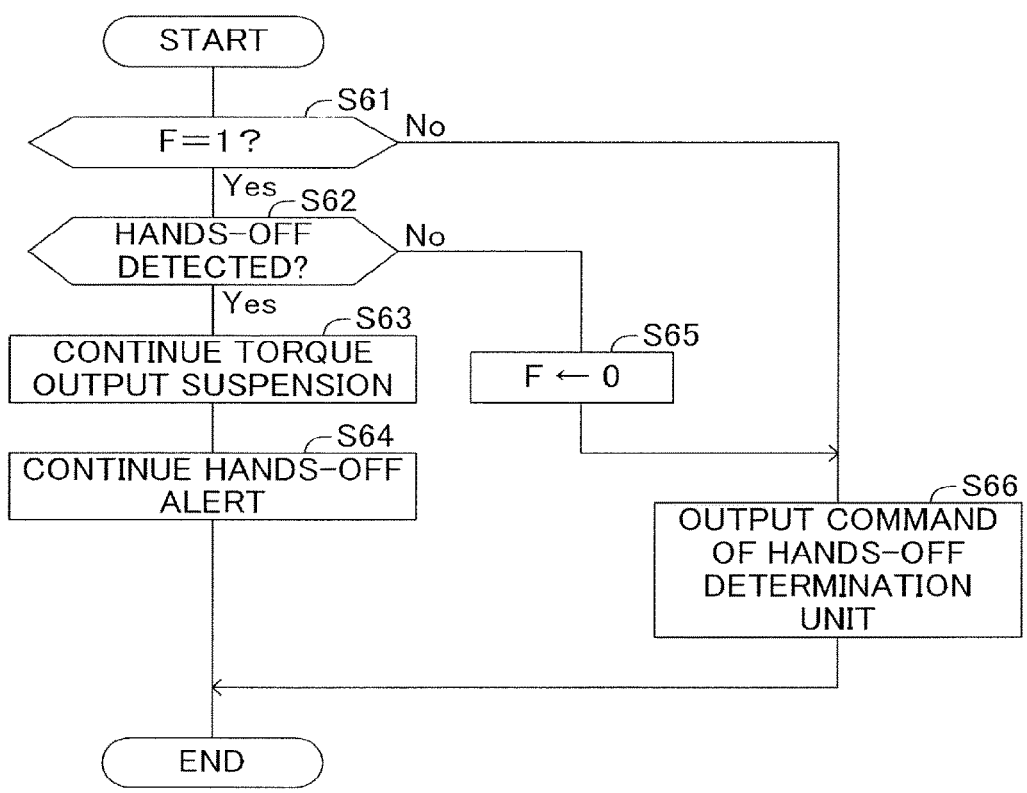
FIG. 11 is a flowchart for illustrating an output control routine according to the second embodiment.

The arbitration unit 16 is connected to the EPS-ECU 30, the notification device 43, and the steering torque sensor 32. A description is now given of the processing of the arbitration unit 16 referring to a flowchart. FIG. 10 is a flowchart for illustrating a flag setting routine carried out by the arbitration unit 16. FIG. 11 is a flowchart for illustrating an output control routine carried out by the arbitration unit 16. The flag setting routine and the output control routine are repeatedly executed respectively at predetermined calculation cycles.

When the flag setting routine is started, in Step S51, the arbitration unit 16 reads mode determination information output by the mode determination unit 12, and determines whether the control mode represented by the mode determination information has been switched. In other words, the arbitration unit 16 determines whether the control mode represented by the mode determination information read one calculation cycle before and the control mode represented by the mode determination information read for the current time are different from each other.

When the arbitration unit 16 determines that the control mode has not been switched, the arbitration unit 16 once finishes the flag setting routine. The arbitration unit 16 repeats the flag setting routine at a predetermined calculation cycle, and, when the switching of the control mode is detected in Step S51, in Step S52, determines whether the hands-off driving handling processing has been carried out until immediately before the switching of the control mode. When the hands-off driving handling processing has been carried out, that is, the hands-off driving of the driver had been detected until immediately before the switching of the control mode (Yes in Step S52), the arbitration unit 16 sets a flag F to "1". When the hands-off driving handling processing has not been carried out (No in Step S52), the arbitration unit 16 once finishes this routine.

An initial value of the flag F is "0". As described later, this flag F is returned to "0" at a time point when the steering operation of the driver is detected. Thus, the value "1" of the flag F represents a period from the switching of the control mode under the state in which the driver is determined to be carrying out the hands-off driving to the detection of the steering operation of the driver (period until the no-operation state is no longer detected).

The arbitration unit 16 carries out the output control routine in parallel with the flag setting routine. When the output control routine is started, in Step S61, the arbitration unit 16 determines whether the flag F is set to "1". When the flag F is set to "0" (No in Step S61), in Step S66, the arbitration unit 16 directly transmits the command received from the hands-off determination unit 15 or the hands-off determination unit 22 to the EPS-ECU 30 or the notification device 43. In this case, when the arbitration unit 16 has received the steering command representing the target steering torque T*, the arbitration unit 16 transmits the steering command to the EPS-ECU 30. When the arbitration unit 16 has received the alert command, the arbitration unit 16 transmits the alert command to the notification device 43.

On the other hand, when the flag F is set to "1" (Yes in Step S61), that is, when the hands-off driving handling processing has been carried out until immediately before the switching of the control mode, in Step S62, the arbitration unit 16 estimates whether the driver is keeping the hands off the steering wheel. In this case, the arbitration unit 16 determines whether the steering torque detected by the steering torque sensor 32 is equal to or less than the no-operation determination threshold (e.g., zero).

When the arbitration unit 16 estimates that the driver is keeping the hands off the steering wheel (Yes in Step S63), the arbitration unit 16 determines that the hands-off driving of the driver continues, and continues the hands-off driving handling processing without stopping this processing. In other words, in Step S63, the arbitration unit 16 continues the stop state of the transmission of the steering command, and in Step S64, continues the transmission of the hands-off alert command to the notification device 43.

The arbitration unit 16 repeats the above-mentioned processing at a predetermined calculation cycle. When the steering wheel operation of the driver is detected in Step S62 (Yes in Step S62), in Step S65, the arbitration unit 16 sets the flag F to "0", and advances the processing to Step S66.

With the driving support apparatus 2 for a vehicle of the second embodiment, when the control mode is switched under the state in which the driver is carrying out the hands-off driving, the flag F is set to "1", and the setting of the flag F (F=1) is maintained until the no-operation state is no longer detected. Thus, the state in which the flag F is "1" causes the determination that the driver is carrying out the hands-off driving to be maintained, and the hands-off driving handling processing (S63, S64) is continued during the period in which the determination is maintained.

Thus, also in the driving support apparatus 2 for a vehicle of the second embodiment, the alert by the notification device 43 is not stopped, or the output of the steering assist torque is not started while the driver is carrying out the hands-off driving. As a result, the driver can be prevented from feeling the sense of discomfort.

In the above, the driving support apparatus for a vehicle according to this embodiment has been described. However, the present invention is not limited to the above-mentioned embodiment. Various changes are possible within the range not departing from the object of the present invention.

For example, in this embodiment, the timer count value t is incremented, but the timer count value may be decremented from the initial value, and when the value becomes less than the hands-off driving determination period tref, the driver may be determined to be carrying out the hands-off driving.

The LDA-ECUs 10 and 100 may be configured to apply the steering assist torque to the steering mechanism, and cause the notification device 43 to notify of the lane departure alert while the lane departure alert control is being carried out. For example, in Step S17 of the driving support control routine of FIG. 7, the steering command may be transmitted to the EPS-ECU 30, and the notification command for the lane departure alert may be transmitted to the notification device 43.

In this embodiment, as the hands-off driving handling processing, the output of the steering assist torque is suspended (S25, S63), and the hands-off alert notification is carried out (S26, S64). However, those two pieces of processing do not always need to be carried out, and any one of the two pieces of processing may be carried out. Moreover, those two pieces of processing do not need to be simultaneously carried out. For example, when the hands-off driving is still continued after a predetermined period since the start of the hands-off alert notification, the suspension of the output of the steering assist torque may be started.

In the first embodiment, the white line recognition unit 11, the mode determination unit 12, and the hands-off determination unit 14 are provided only in the LDA-ECU 10. However, alternatively, the white line recognition unit 11, the mode determination unit 12, and the hands-off determination unit 14 may be provided only in the LKA-ECU 20 so that the driving support control routine may be carried out by the LKA-ECU 20.

What is claimed is:

1. A driving support apparatus, comprising:
   lane keep assist control means for carrying out lane keep assist control, which is control for supporting a steering operation of a driver by applying a first steering assist torque for keeping a travel position of an own vehicle near a target travel line to a steering mechanism;
   lane departure alert control means for carrying out lane departure alert control, which is control for supporting the steering operation of the driver by applying a second steering assist torque for preventing the own vehicle from departing from a travel lane to the steering mechanism;
   mode switching means for switching a control mode between a lane keep assist control mode, which is a control mode in which the lane keep assist control means carries out the lane keep assist control and the lane departure alert control means does not carry out the lane departure alert control, and a lane departure alert control mode, which is a control mode in which the lane departure alert control means carries out the lane departure alert control and the lane keep assist control means does not carry out the lane keep assist control;

hands-off driving determination means for, in each of the lane keep assist control mode and the lane departure alert control mode, when a no-operation state in which the driver is estimated not to be operating a steering wheel is detected, starting measurement of a no-operation state continuation period, which is a continuation period in which the no-operation state is detected, and determining that the driver is carrying out hands-off driving when the no-operation state continuation period is more than a hands-off driving determination period; and hands-off driving handling processing means for carrying out hands-off driving handling processing set in advance when the driver is determined to be carrying out the hands-off driving, wherein the hands-off driving determination means is configured to carry out one of taking over, when the control mode is switched between the lane keep assist control mode and the lane departure alert control mode under a state in which the measurement of the no-operation state continuation period has been started, a value of the no-operation state continuation period that has been measured until the switching of the control mode, thereby continuing the measurement of the no-operation state continuation period, and maintaining, when the control mode is switched between the lane keep assist control mode and the lane departure alert control mode under a state in which the driver is determined to be carrying out the hands-off driving, a result of the determination until the no-operation state is no longer detected.

2. The driving support apparatus for a vehicle according to claim 1, where the hands-off driving determination means is configured to use a common timer to measure the no-operation state continuation period over both of the lane keep assist control mode and the lane departure alert control mode.

3. A driving support apparatus, comprising:
a steering assist torque application device configured to apply a steering assist torque to a steering mechanism;
a first control unit configured to carry out lane keep assist control, which is control for supporting a steering operation of a driver by using the steering assist torque application device to apply a first steering assist torque for keeping a travel position of an own vehicle near a target travel line to the steering mechanism; and
a second control unit other than the first control unit, and configured to carry out lane departure alert control, which is control for supporting the steering operation of the driver by using the steering assist torque application device to apply a second steering assist torque for preventing the own vehicle from departing from a travel lane to the steering mechanism, wherein:
only one of the first control unit and the second control unit is configured to determine which of (1) a lane keep assist control mode for carrying out the lane keep assist control and not carrying out the lane departure alert control and (2) a lane departure alert control mode for carrying out the lane departure alert control and not carrying out the lane keep assist control is to be carried out, and to transmit a result of the determination to the other one of the first control unit and the second control unit; and
only one of the first control unit and the second control unit is configured to measure a no-operation state continuation period in which a no-operation state, in which the driver is estimated not to be operating a steering wheel, is detected over both of the lane keep assist control mode and the lane departure alert control mode, determine that the driver is carrying out hands-off driving when the no-operation state continuation period is more than a hands-off driving determination period, and carry out hands-off driving handling processing set in advance when the driver is determined to be carrying out the hands-off driving.

4. A driving support apparatus, comprising:
circuitry configured to:
carry out lane keep assist control, which is control for supporting a steering operation of a driver by applying a first steering assist torque for keeping a travel position of an own vehicle near a target travel line to a steering mechanism;
carry out lane departure alert control, which is control for supporting the steering operation of the driver by applying a second steering assist torque for preventing the own vehicle from departing from a travel lane to the steering mechanism;
switch a control mode between a lane keep assist control mode, which is a control mode in which the lane keep assist control is carried out and the lane departure alert control is not carried out, and a lane departure alert control mode, which is a control mode in which the lane departure alert control is carried out and the lane keep assist control is not carried out;
in each of the lane keep assist control mode and the lane departure alert control mode, when a no-operation state in which the driver is estimated not to be operating a steering wheel is detected, start measurement of a no-operation state continuation period, which is a continuation period in which the no-operation state is detected;
determine that the driver is carrying out hands-off driving when the no-operation state continuation period is more than a hands-off driving determination period;
carry out hands-off driving handling processing set in advance when the driver is determined to be carrying out the hands-off driving: and
carry out one of taking over, when the control mode is switched between the lane keep assist control mode and the lane departure alert control mode under a state in which the measurement of the no-operation state continuation period has been started, a value of the no-operation state continuation period that has been measured until the switching of the control mode, thereby continuing the measurement of the no-operation state continuation period, and maintaining, when the control mode is switched between the lane keep assist control mode and the lane departure alert control mode under a state in which the driver is determined to be carrying out the hands-off driving, a result of the determination until the no-operation state is no longer detected.

* * * * *